United States Patent [19]

Schulz et al.

[11] 4,246,978
[45] Jan. 27, 1981

[54] PROPULSION SYSTEM

[75] Inventors: Helmut W. Schulz, Harrison; Gerald A. Domoto, Briarcliff Manor, both of N.Y.

[73] Assignee: Dynecology, Harrison, N.Y.

[21] Appl. No.: 11,719

[22] Filed: Feb. 12, 1979

[51] Int. Cl.³ ............................................. B60K 3/00
[52] U.S. Cl. ..................................... 180/165; 60/414
[58] Field of Search ............... 180/165; 296/1 R, 185, 296/186, 187; 60/414, 413, 416, 408, 418, 371

[56] References Cited

U.S. PATENT DOCUMENTS

| 3,892,283 | 7/1975 | Johnson | 180/165 |
| 3,903,696 | 9/1975 | Carman | 60/414 |
| 4,163,367 | 8/1979 | Yeh | 60/414 |

Primary Examiner—Stanley H. Tollberg
Assistant Examiner—Kenneth Noland
Attorney, Agent, or Firm—Robert I. Pearlman

[57] ABSTRACT

A propulsion system for a vehicle comprising a hydrostatic transmission wherein the system typically includes an electric motor, a hydrostatic pump preferably of the continuous variable displacement type, hydrostatic motors for cooperation with the wheel axles of the vehicle, and a gas accumulator which provides for the compression and expansion of a gaseous medium depending on whether the transmission fluid is being pumped into or withdrawn from the gas accumulator. The gas accumulator comprises a pressure vessel which serves as a structural member of the vehicle. It may have a tubular configuration disposed as a load-bearing structural member of the chassis or it may comprise a number of interconnected pressure-retaining panels, that form the vertical sides and/or roof sections of the vehicle. Suitable mechanical and electrical/electronic controls are provided to monitor the gas pressure in the gas accumulator and to regulate the stroke and function of the hydrostatic pumps and motors.

19 Claims, 16 Drawing Figures

PROPULSION SYSTEM

BACKGROUND OF THE INVENTION

Energy conservation in metropolitan mass rapid transit systems can same electric energy, free generating capacity for other electric power needs, and produce substantial dollar savings. Thus, for example, in the New York City subway system, the efficient application of regenerative braking (i.e., recovery, storage and reemployment of kinetic energy possessed by a moving vehicle at the onset of braking) can lead to energy savings of 40%, which is equivalent to a savings of 40 million dollars a year.

One of the difficulties in implementing regenerative braking with conventional, electric-motor-propelled subway cars is that the recovery of the kinetic energy of a speeding train is limited by the natural receptivity of the system, i.e., the proximate availability of accelerating trains to accept the power generated by decelerating trains. An earlier study has shown ("Energy Conservation in the New York Subway System," Schulz, H. W., H. E. Meadows, G. A. Domoto et al., Sept. 30, 1976, Columbia University) that the natural receptivity of the New York subway system is only 40%. This factor alone would reduce the potential energy savings from 40% to 16%. In addition, the series-parallel configuration of the present New York City cars would impose additional inefficiencies (by virtue of voltage limitations) in returning regenerated power to the third rail.

The above limitations are eliminated if provision is made on each car or train to store the kinetic energy possessed by the train at the inception of braking in a form that could readily be utilized to accelerate the train after it has stopped at a station. One means of accomplishing this objective is to equip each car with one or two spinning flywheels which can store the regenerated energy mechanically. The technical efficiency of this means of energy storage has been demonstrated in revenue service by experimental flywheel cars operated by the New York City Transit Authority. However, the cost of retrofitting the existing cars with flywheels has been shown to be prohibitive. Even when considering the purchase of new cars, the flywheel car configuration is a very costly option both from the standpoint of capital cost and incremental maintenance charges.

The present invention provides a novel system of on-board energy storage which comprises a lightweight, low-cost hydrostatic transmission and a gas accumulator which has no moving parts.

Another propulsion system which has utility for the storage of kinetic energy during vehicle deceleration is disclosed in U.S. Pat. No. 3,903,696 of Carman. That prior art system generally discloses elements of a hydrostatic transmission and gas accumulator primarily for use in storing energy of a single unit vehicle, such as a trailer or tractor and the like. This system employs a conventional hydrostatic transmission and conventional cylindrical pressure vessel to serve as the gas accumulator. Both of these prior art devices contribute excessive weight to the vehicle which has precluded their commercial utilization because of the resultant high capital and operating costs.

It is a purpose of the present invention to provide a propulsion system of markedly reduced weight by uniquely combining a hydrostatic transmission of the variable displacement radial piston type with novel gas accumulator pressure vessels that serve as structural members of the vehicle, thus avoiding the introduction of redundant weight.

SUMMARY OF THE INVENTION

The present invention relates to an improved propulsion system for mass rapid transit vehicles such as subway cars, street cars or motor buses which conserves energy by efficiently storing the kinetic energy of the moving vehicle through the application of regenerative braking during the deceleration phase and then employing the stored energy for accelerating the vehicle after a stop.

The present invention overcomes the deficiencies and disadvantages of the prior art by combining features, some of which are known, in order to provide an efficient means for using the regenerative braking principle to assure substantially 100% on-board receptivity of the regenerated energy. More particularly, the present invention accomplishes this objective without incurring the hitherto prohibitive weight penalties that have traditionally attended the use of hydrostatic transmissions and gas accumulation vessels of conventional design. Thus, the present invention provides for the disposition of the gas accumulator volume in the form of gas confining tubular structural members or pressure vessel panels of unique construction. The cooperating hydrostatic pumps and motors are of the variable displacement radial piston type which not only facilitate the storage of energy through gas compression during dynamic braking but which also makes possible important cost savings by obviating the need for such expensive components as controllers and gear boxes, and by reducing the required capacity of the prime movers (e.g., electric motor or diesel engine).

In one of its embodiments, the present invention provides for the separation of the hydraulic fluid and the compressed air in the accumulator by means of a hydraulically operated centrifugal air compressor which affords additional weight savings by dramatically reducing the pressure level to which the air must be compressed to affect the storage of a given amount of kinetic energy. In another embodiment, the average design pressure of the gas accumulator is reduced by disposing the gas accumulator in a series of stages so that only the last stage need withstand the full system pressure.

The present propulsion system basically comprises a hydrostatic transmission and a gas accumulator which individually are generally known; however, they are combined according to the present invention in a unique manner on a vehicle such as a railway car or autobus, without the attendant normal weight penalties associated with the employment of such an accumulator. These novel combined features essential comprise an electric motor, a hydrostatic pump with continuously variable displacement, a pair of hydrostatic motors associated with each vehicle axle, and a gas accumulator for providing compression and expansion of a gaseous medium depending on whether the transmission fluid is being pumped into or withdrawn from the accumulator and being disposed in such a manner that it comprises an integral structural part of the vehicle structure which is being propelled by the system. In addition, there is normally provided a system of mechanical and electronic/electrical controls for monitoring pressure within the accumulator and regulating the operation of the hydrostatic pumps and motors. Preferably, the hydrostatic transmission is designed to provide a very high ratio of transmitted horsepower per unit of weight of the transmission. The type of transmission which will accomplish this, although the present invention is not necessarily limited to that transmission, is commonly known as a "Tobias" hydrostatic transmission (for example, see U.S. Pat. Nos. 3,345,916 (Tobias) and 3,709,104 (Culberson)). A typical transmission is light and cost-effective, and can be characterized by having a radial piston hydraulic pump or motor with parallel pairs of Scott-Russell linkages interposed between the pistons and the reaction assembly including means for varying the length of the piston stroke. The gas accumulator, on the other hand, is uniquely deployed as an integral structural part of the vehicle which is being propelled by the system. A typical accumulator may comprise a plurality of cylindrical or tubular pressure vessels to which liquid transmission fluid is admitted from a lower level to compress the gas trapped in the tubular array that is normally disposed horizontally at a higher level. A variety of different tubing configurations will be satisfactory and, for example, may involve disposing the tubes to serve as the floor member of the vehicle (e.g., railway car). Contiguous tubes may be spot welded to one another in order to form a stout structural member. The essence is to make the gas accumulator an integral structural part of the vehicle chassis. Suitable energy absorbing collision impact shields would be provided for protecting this high pressure tubing against any compressive strains in the case of collision and the like. Alternatively, the gas accumulator volume may be disposed in the form of hollow panels which serve as the vertical sides and/or roof members of the vehicle and which are constructed to safely contain the highest pressure to which the gas is to be compressed in the accumulator. The novel design and construction of these panels is more particularly described hereinafter. Still other alternatives to the disposition and location of the accumulator can be employed, such as use of vertical cylindrical pressure vessels which are mounted on a separate truck and surrounded by an open steel cylinder which serves as a shield. These accumulator vessels are connected to the hydraulic propulsion system of the adjacent passenger cars by means of flexible pressure hoses.

A suitable control system may take the form of various acceptable configurations and arrangements. For example, in the preferred embodiment, the transmission fluid may be pumped into the gas accumulator for energy storage purposes until a sensed gas pressure level is reached, i.e. a maximum of, for example, 300 atmospheres. The fluid then can be withdrawn to drive the hydrostatic pump associated with the hydrostatic motor for each wheel or, alternatively, may be withdrawn to directly drive the hydrostatic motors for propelling the vehicle until the gas pressure reaches a particular specified minimum value, for example 100 atmospheres. These controls likewise may provide for pumping fluid into the gas accumulator while the car is stopped at various places or stations by employing the electric motor to drive the hydrostatic pump which then pumps the fluid into the gas accumulator until the maximum pressure is reached.

DESCRIPTION OF THE DRAWINGS

FIGS. 7 through 10 illustrate various embodiments of the gas accumulator integral construction as a structural part of the vehicle.

DESCRIPTION OF PREFERRED EMBODIMENTS

Figure 1:
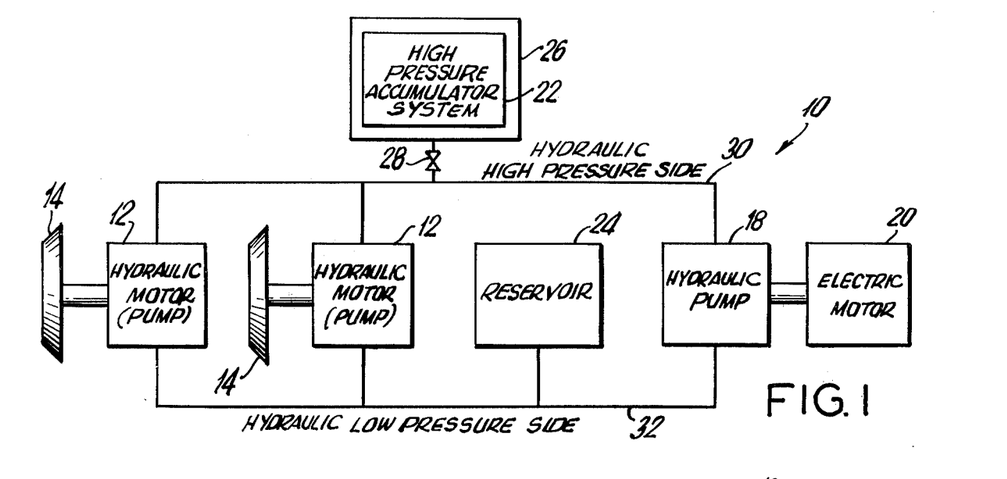
FIG. 1 is a schematic diagram of a propulsion system according to the present invention.

Referring now to the drawings wherein like parts are designated by the same reference numerals throughout the several views, there is shown in FIG. 1 a schematic illustration of the propulsion system according to the present invention. This system generally designated 10 comprises a plurality of hydraulic motors (pumps) 12 connected either through gears or directly to the wheels 14 of a vehicle 16 which is being propelled by the system. There is also provided one or more hydraulic pumps 18 which are connected to a corresponding electric motor or motors 20. Only one electric motor is shown; however, more may be used if it is desired to avoid using a single large motor as determined by size and efficiency requirements. All of the hydraulic units preferably are of the light weight radial piston type having continuously variable displacement which can be used either as a pump or motor. A preferred type of hydrostatic transmission is disclosed in U.S. Pat. No. 3,709,104, commonly known as "Tobias" transmission. In addition to these hydraulic pumps and motors and their normally associated heat exchangers and charging pumps, there is provided as part of the present system a high pressure gas accumulator system 22 and a fluid reservoir 24. The purpose of the gas accumulator is for the storage, as a high pressure gas, of the kinetic energy of the vehicle which normally is dissipated as heat during deceleration. As illustrated, the accumulator system is surrounded by an impact absorbing system 26 and is coupled through a valve 28 on the high pressure side 30 to the hydraulic motors and pumps. The opposite side of each of these components as well as the fluid reservoir is connected to the low pressure side 32 of the system.

A description of the operation of the system is as follows. For purposes of explaining the operation, a typical acceleration/deceleration cycle will be described. In its initial state, the system is at zero velocity and the accumulator system is at maximum pressure. This state was arrived at by a previous deceleration phase or by use of the electric motor 20 to drive the hydraulic pump 18 while the hydraulic motors 12 connected to the wheels 14 were at zero displacement position, that is acting as a closed valve. For acceleration to occur, the high pressure gas in the accumulator is permitted to expand, thus forcing hydraulic fluid out of the accumulator system and through the opened valve 28 to the hydraulic motors 12 connected to the respective wheels. As the fluid causes positive displacement of the hydraulic motors, acceleration of the train or other vehicle occurs, i.e., an increase in the train or vehicle's kinetic energy is achieved while drawing on the energy stored in the high pressure gas. This operational mode continues until a preset lower accumulator pressure level is reached, at which point that level is sensed and the accumulator is turned off by closing valve 28 with respect to the overall propulsion system, whereupon external power is automatically caused to be drawn from the electric motor 20 through the hydraulic pump 18 which causes hydraulic fluid to flow from reservoir 24 to the hydraulic motors. This particular type of operation can be used for achieving a required or desired maximum speed at which point coasting can be instituted, that is, hydraulic pumps and motors are placed in their neutral or zero displacement modes and no additional energy is drawn from the accumulator or electric motor. The deceleration phase is next described. Through suitable coupling means (e.g., shaft and/or gearing) the hydraulic motors 12 connected to the vehicle wheels 14 are caused to function as hydraulic pumps by setting their displacement to a negative value or by some suitable valving arrangement. The hydraulic motors in their negative displacement mode, when connected to the wheels will pump hydraulic fluid from the low pressure side 32 of the system, that is from the fluid reservoir 24, into the accumulator which causes compression of the gas in the accumulator and converts the kinetic energy of the vehicle to be stored energy in the form of compressed gas. This operational phase will continue until the vehicle decelerates to zero velocity or to a velocity sufficiently low at which time mechanical braking may occur.

Figure 2A:
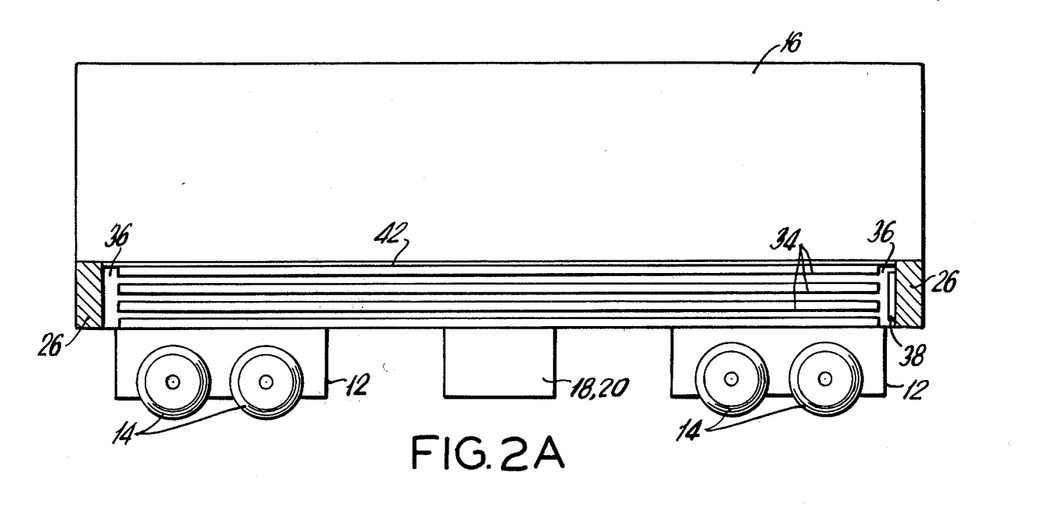
FIGS. 2A and 2B illustrate side and end views, respectively, of a typical vehicle such as a railway vehicle for a subway system incorporating components of and according to the present invention.
Figure 2B:
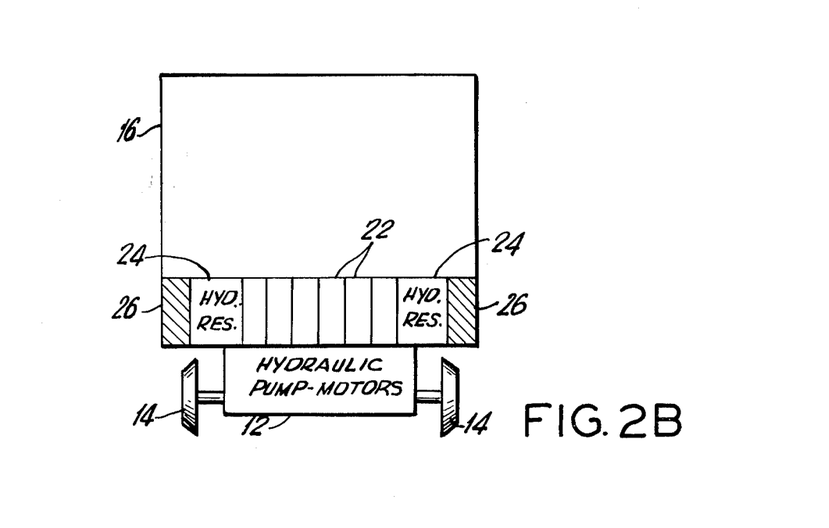

The aforedescribed system can readily be incorporated as part of a vehicle such as a railway car. As shown in FIG. 2, the accumulator may comprise a plurality of high pressure steel tubes 34 arranged in parallel and connected at opposite ends to a common header 36. At the high pressure end there may be a hydraulic fluid level and pressure sensor 38 (such as a piezoelectric pressure transducer or capacitor probe) for sensing the pressure within the tubing and also the level of fluid. As shown, the vehicle 16 is a conventional railway car and the accumulator is situated in the floor or bottom portion of the vehicle. The liquid reservoir shown at 40 is also located in the floor of the vehicle. With the multistage gas accumulator and fluid reservoir integrated into the vehicle structure, it is desirable to have a collision shield 26 which will protect the accumulator and reservoir in the case of collision or impact. This is shown at opposite ends of the accumulator and also would be situated on the outermost extremity (sides) and bottom if desired for the length of the car to form a continuous casing that would protect in case of impact a collision. The wheels of the vehicle are connected in a conventional manner to the hydraulic motor-pumps and the electric motor and hydrualic pump are situated somewhere in between the wheels on the underside of the car. Suitable material for forming the collision shield may comprise a honeycomb or other appropriate energy absorbing structure. As a further protective measure, the accumulator is separated from the upper portion of the vehicle by a steel shield partition 42 (e.g., floor of the car) which runs the length of the propulsion system according to the invention.

By using a gas accumulator for storing energy caused by deceleration of a moving vehicle, the kinetic energy of the decelerating vehicle is stored as explained previously by compressing gas in a high pressure gas accumulator. The vehicle mass and the maximum velocity prior to the deceleration will determine the mass, maximum volume and pressure levels of the gas which will be compressed in the accumulator. On the other hand, the size, volume, shape and maximum gas pressure levels will determine the strength requirements of the gas accumulator and thus its weight. Weight of the accumulator system is a very important and significant economic consideration and thus optimizing to obtain the lowest ratio of accumulator weight per energy stored is necessary. By employing multiple stages for the accumulator system, this desired weight savings can be accomplished. In a typical system which uses hydraulic charging of a gas accumulator, the accumulator comprises a relatively large high pressure vessel which contains a fixed mass of gas. Hydraulic fluid at a high pressure is introduced into the accumulator through high pressure lines and valves and the fluid is kept separate from the gas by a piston or simply by an interface between the gas and fluid formed due to gravity. In these systems the introduction of the hydrualic fluid will cause a decrease in the gas volume. This decrease in gas volume is proportional to the volume of hydraulic fluid added and will result in an increase in gas pressure which results in storage of energy as compressed gas. This storage of energy can continue until the maximum pressure dictated by the accumulator vessel maximum stress characteristics is reached. These systems are usually single stage accumulators; the entire accumulator must be able to withstand the maximum pressure. Thus, for any single stage design, a high weight can be anticipated since the total accumulator gas volume will be fixed by the energy storage requirements.

Figure 3:
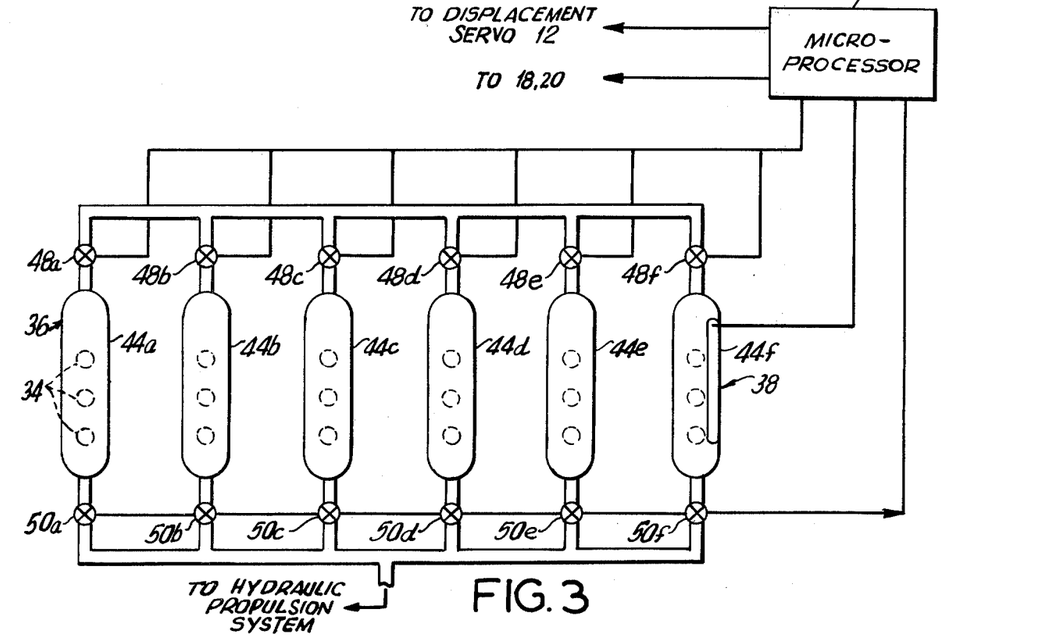
FIG. 3 illustrates a typical gas accumulator according to the present invention.

As shown in FIG. 3, a typical gas accumulator 22 having multiple separate stages 44a through 44f is illustrated with typical controls. These controls would be required for automatically operating the valving as well as implementing the pressure in all level sensors for each stage and can be programmed by means of a microprocessor 46 to open and close the appropriate flow valves 48a–48f and hydraulic fluid valves 50a–50f in proper sequence depending on the predetermined stage pressure or fluid levels for both gas compression in expansion phases. As illustrated, each of the gas flow valves 48 is coupled to the microprocessor 46 on board the vehicle which in turn is connected with the electric motor and hydraulic pump 18,20 and the displacement servo which is mounted on the hydraulic pump-motors 12 at the vehicle wheels. Similarly, the hydraulic fluid valves 50 are coupled to the microprocessor 46 and each stage is provided with a pressure and hydraulic fluid level sensor 38 as shown in only one of the stages.

Figure 4A:
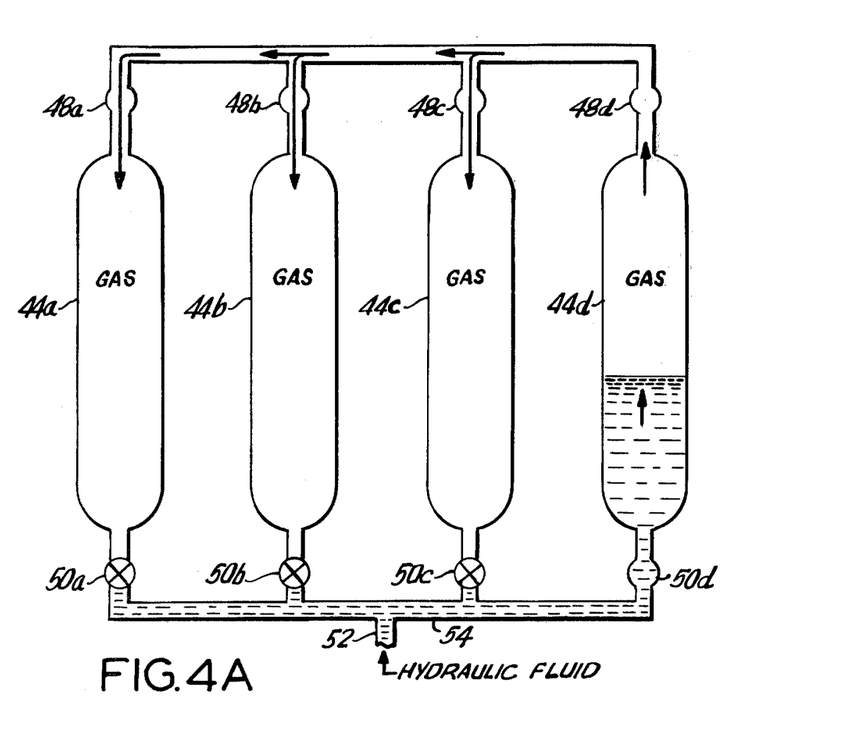
FIGS. 4A through 4C illustrate operation of a typical gas accumulator according to the present invention.
Figure 4B:
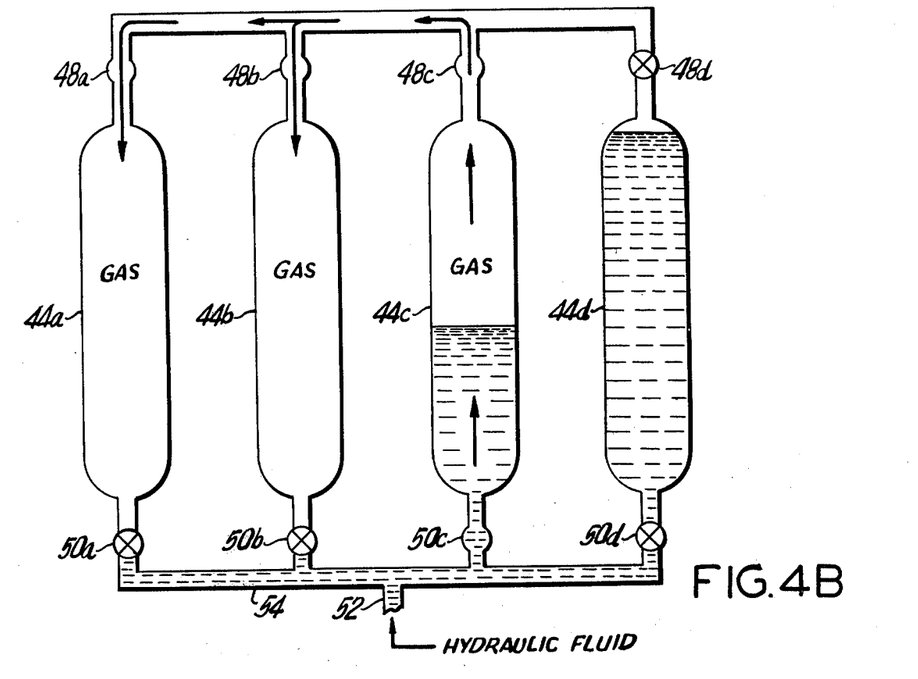
Figure 4C:
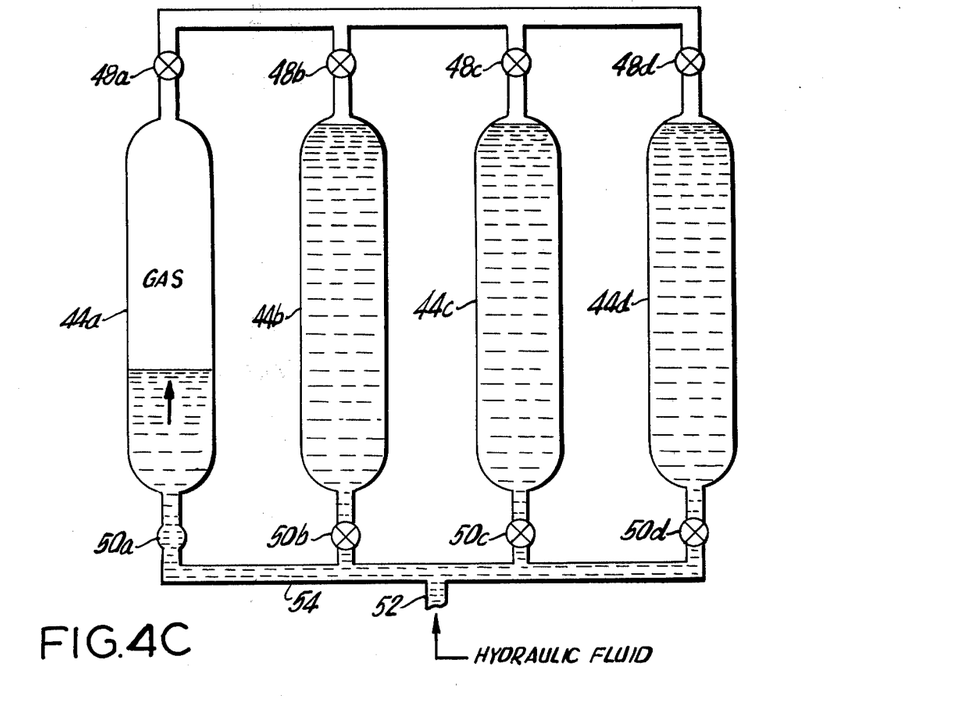
Figure 6A:
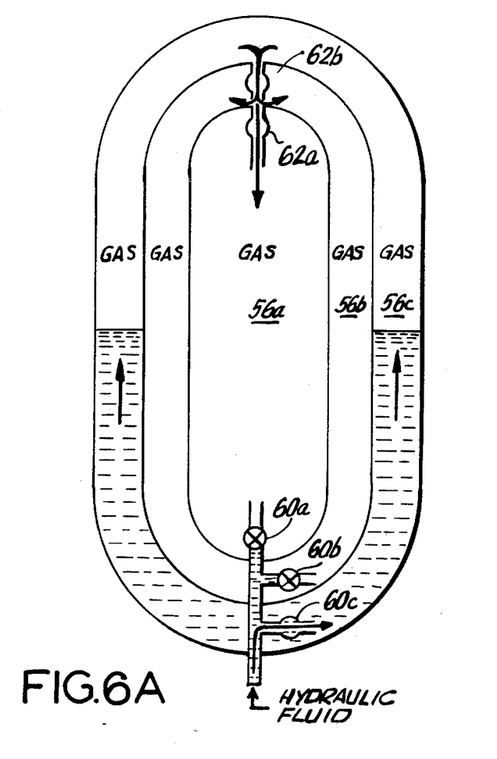
FIGS. 6A and 6B illustrate operation of an alternate embodiment to the gas accumulator of FIG. 3.
Figure 6B:
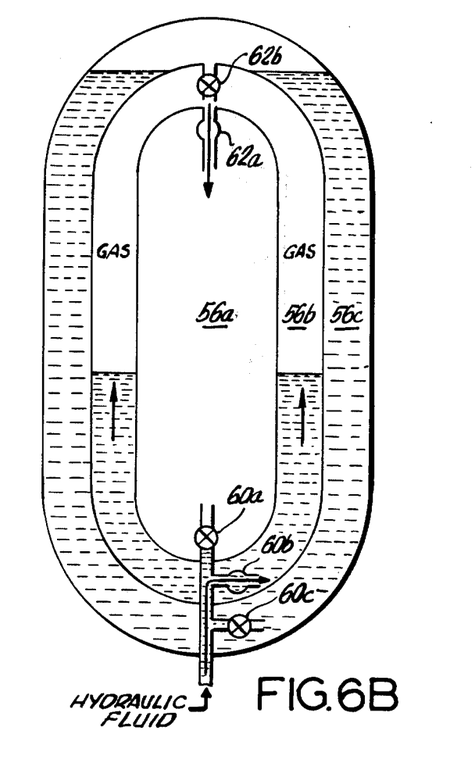

According to the present invention, however, there is provided different multi-stage accumulator configurations. As shown in FIGS. 4A, 4B and 4C, there is provided a plurality of separate accumulator pressure vessels 44 sized for each stage. Another alternate embodiment comprising a nested multi-stage accumulator design is shown in FIG. 6. While each illustrates a vertical orientation of the vessels, for use in a horizontal disposition, the accumulators would include a vertical sump, i.e., as shown in FIG. 3, for each stage in order to provide phase separation between the gas and fluid. The total number of stages employed may vary; however, four have been illustrated in FIG. 4 for purposes of this description of the operation. In the separate multi-stage configuration, each stage essentially is charged with a hydraulic fluid which in turn compresses gas in the uncharged stages. FIG. 4A illustrates charging of stage 44d. Thus, hydraulic fluid from the reservoir 24 is fed via an inlet 52 through conduit line 54 to the first stage. Valves 50a, b and c for the other illustrated stages are closed while the inlet valve 50d for the first stage is open. The outlet gas flow valves 48 from each of the stages are also open. As the fluid flows into stage 44d, gas will flow from that stage into the remaining uncharged accumulator stages. When substantially all of the gas in stage 44c has been forced into the other stages 44a, 44b and 44c, stage 44d will be turned off completely by closing the inlet and outlet valves 50d and 48d so that it will remain at the maximum pressure it has attained during this portion of the charging phase. This pressure is much lower than the maximum accumulator pressure, for example in the case of a single stage, conventional accumulator. This permits stage 44d to be designed for a maximum pressure that is substantially below the accumulator maximum pressure which permits lesser side wall construction (i.e., thinner) than normally required. Referring now to FIG. 4B, the charging of stage 44c is illustrated. Again, the maximum pressure experienced by stage 44c is substantially below the maximum accumulator system pressure. This type of multi-stage compression can continue until each stage except for the last stage n, herein shown as stage 44a, has a maximum pressure below system maximum pressure. Only that final stage, with a relatively small volume in comparison to the other stages, will actually experience maximum system pressure. Since the gas volume, mass and pressure levels depend only on the amount of energy stored, this will remain the same whether a single stage or multi-stage accumulator is used. The multistage accumulator will achieve a significant weight advantage since each stage will be sized to withstand a substantially lower pressure relative to the maximum system pressure, with the exception of the final stage which is required to withstand maximum system pressure, however, only within a small volume.

Figure 5:
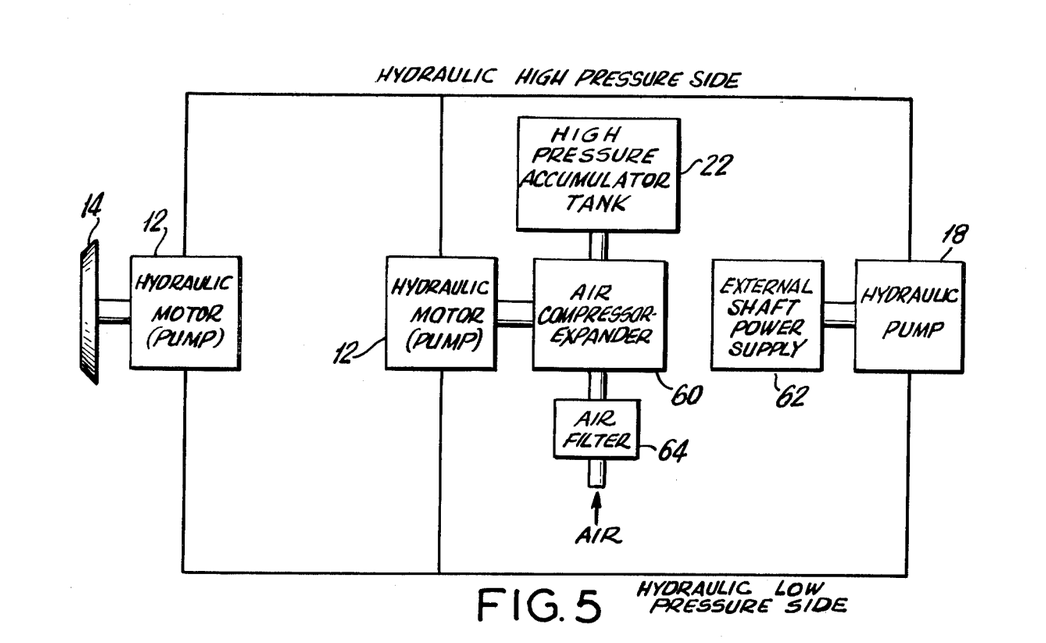
FIG. 5 illustrates an alternate embodiment of the propulsion system of FIG. 1.

Referring to the multi-stage gas accumulator having a nested configuration (FIGS. 6A and 6B), this configuration will operate similar to that of FIG. 3; however, it uses a slightly different configuration and arrangement. Since the maximum stress will depend on the pressure differences across the walls of each vessel, the nested arrangement will act to reduce the pressure difference and thus reduce maximum stress on all walls which reduces the required thicknesses and weight. The stages are shown concentrically arranged about an inner stage 56a proceeding outwardly through intermediate stage 56b and outer stage 56c. This is in contrast to the parallel stages of FIG. 4. The hydraulic fluid is received from an inlet line 58 which branches off into each of the nested stages via valves 60a, 60b and 60c, respectively. Associated with each stage is an outlet valve 62 leading into the adjacent stage so that as each stage is filled the fluid is forced into the next adjacent stage and so on until all are completely filled. Gas flows into the inner stages and fluid flows into stage 56c until substantially all of the gas is forced out of stage 56c, whereupon it is completely valved off from the system as shown in FIG. 6A. The charging of stage 56b is illustrated in FIG. 5B. The large weight advantage is obtained since the pressure difference across any one wall between stages is substantially lower than that which would occur in a single stage accumulator.

The accumulators of FIGS. 5 and 6 illustrate the energy storage phase of operation according to the present invention. To be useful, the systems have to be capable of delivering the stored energies required during the gas expansion stage. This is accomplished by reversing the sequence of events which occurred during the compression phase. Thus, assuming that the compression phase is completed, the gas in the last stage n of the multistage accumulator is at its maximum design pressure and all stages are valved off. The hydraulic fluid valve 50a at the bottom of the last stage is opened and fluid is forced out of the last stage through the conduit lines allowing the compressed gas to expand. This hydraulic fluid at high pressure flows through the hydraulic motor (e.g., 12) with which it is connected, doing useful work such as turning the vehicle wheels causing the vehicle to accelerate. This will continue until the hydraulic fluid in the final stage is depleted, whereupon the bottom hydraulic valve 50a of the last stage is closed and the gas valve 48b of the next-to-last stage 44b is opened. This will allow gas to flow from the last stage 44a into the next-to-last stage 44b, and upon opening the hydraulic fluid valve 50b of the latter, the gas will expand in that stage and energy stored which is a compressed gas, will be converted into a high pressure flow of hydraulic fluid that can also do useful work. This process will continue until all the fluid has been forced from each of the stages and the multi-stage accumulator is in its pre-compression state. It is envisioned that this process will be a cyclic operation with gas compression occurring during vehicle deceleration and gas expansion occurring during vehicle acceleration. Basically what occurs is an energy conversion process, wherein during vehicle deceleration kinetic energy of the train is converted to energy stored in the form of compressed gas in the accumulator. During vehicle acceleration the stored energy in the form of compressed gas is converted back to kinetic energy of the vehicle. A small amount of external energy would be required to make up for certain irreversible losses during the conversion process.

An alternative embodiment to the system schematically shown in FIG. 1 is best illustrated in FIG. 5. Both propulsion systems, in accordance with the invention, convert kinetic energy of a decelerating vehicle into energy stored in the form of high pressure compressed gas. As previously explained, the stored energy is then reused for subsequent acceleration of the vehicle or for driving auxiliary equipment if desired. It is anticipated that a capability of substantially 100% assured receptivity is attainable. While the simplest method for storing energy in the form of compressed gas is to use the hydraulic fluid of the propulsion system directly to compress gas in a simple accumulator pressure vessel as illustrated in FIG. 1, the simplicity may be offset by the fact that the gas pressure in the accumulator vessels must coincide with the high and low pressure levels of the hydraulic working fluid. Inasmuch as these working pressures are quite high, the strength requirements for the vessels may result in relatively high system weight. Additionally, large reservoirs of hydraulic fluid are required to displace gas in the accumulator vessels. Both of these drawbacks, it is believed, may be eliminated by using a hydraulically driven filtered air compressor turbine system. The air compressor/turbine may be of a multiple stage centrifugal type which operates as a gas turbine during the reverse flow expansion phase. As shown in FIG. 5, the hydraulic motor/pump 12 drives the air compressor/turbine 60 which per se is well known and is connected in parallel with one of the hydraulic motor pumps 12 connected to the vehicle wheels. The hydraulic pump 18 is connected to an external means of energy supply 62 such as an electric motor. All of the hydraulic units are of variable displacement type, e.g., the "Tobias" transmission previously discussed. This variability will permit the propulsion system to match the vehicle wheel torque speed requirements, as well as match very efficiently the speed torque characteristics of the compressor-expander system and those of the external shaft power supply. A typical deceleration phase is described below. With the vehicle at speed prior to initiation of deceleration, the accumulator 22 is at a preset low pressure level (attained at the end of a previous acceleration phase). Displacements are then set. The hydraulic units 12 of the wheels are set to act as pumps (by setting negative displacements), the compressor-expander hydraulic unit 12 will act as a motor and there is zero displacement of the external shaft power supply 62 so that it acts as a closed valve. The active hydraulic units at the wheels and at the air-compressor expander will act as variable hydrostatic transmission using power supplied by decreasing the kinetic energy of the vehicle to compress the ambient air which is filtered through air filter 64 into the accumulator vessel. This will continue until the vehicle has reached sufficiently low speed or a preset maximum pressure has been reached in the accumulator vessels. Maximum pressure in the accumulator will not directly depend on the pressure in the hydraulic working fluid but only on a change in kinetic energy of the vehicle and volume of the accumulator. A suitable air compressor-expander system may comprise either a separate compressor and expander or combined single unit 60. These can be single or multi-stage depending on the value of maximum pressure levels used. During the energy storage phase while the vehicle is decelerating the compressor-expander will act as a compressor, and during the vehicle acceleration or energy delivery phase of the storage system the unit will act as an expander. Once the deceleration is completed and the vehicle has stopped for sufficient length of time, the vehicle acceleration phase will begin. During this phase, the hydraulic motor-pump 12 connected to the wheels 14 will act as a hydraulic motor (i.e., driving the wheels) while those connected to the compressor expander and external power supply will act as hydraulic pumps. During this phase, power can be drawn both or sequentially from the compressed air in the accumulator and/or from the external shaft power supply. The high pressure air will expand from the accumulator 22 through the expander 60 which is connected to the hydraulic pump-motor 12 acting as a pump. Thus, the power transmitted hydraulically to the wheels will cause the vehicle to accelerate. The accumulated pressure is allowed to fall to the preset level and further power requirements beyond that level will be met by relying on the external supply 62. This system has the advantage that the maximum accelerated pressure will not depend on the hydraulic system working pressure. There is no requirement for a large reservoir of hydraulic fluid for gas displacement purposes in the accumulator and the system provides substantial weight and energy savings since the fluid reservoir and high pressure levels have been eliminated.

There has been described a propulsion system which provides for energy storage and reuse of the stored energy through the medium of a gas accumulator which uniquely serves as a structural member (i.e., the side walls, bottom and/or top) of the mass transit vehicle that is being propelled. The compressed gas stored in the accumulator is expanded during the acceleration phase to drive a hydrostatic pump/motor which turns the drive shaft. An embodiment of this novel accumulator design may comprise hollow metal plate panels in which the external metal plates 64 are spaced in parallel relation and integrally joined by means of an open honeycomb structure that permits intercommunication among the resulting cells so that the entire panel serves as a gas-tight pressure vessel experiencing a uniform pressure. The spacing of the parallel plates and the spacing of the reinforcing ribs that form the honeycomb are designed to safely contain the maximum gas pressure to which the gas is compressed during the regenerative braking cycle. The hollow panels may be disposed vertically to form the sides of the cars while making appropriate provision for window and door frames. These panels may be joined and interconnected with one large convex panel that forms the roof of the car. If desired, these panels may also connect with transverse panels below and above the window frames. In this manner, the entire set of interconnecting panels may be maintained at the same gas pressure. The integrally joined panels form the sides and roof of the car while providing for the mounting of window frames in a structurally sound manner. By restricting the thickness of these reinforced panels to the order of one inch or less, it is relatively easy to provide for a pressure rating of 500 psi while employing thin sheet steel, aluminum, or stainless steel for the metallic skin. This design is particularly desirable when employing a gas compressor coupled to a hydrostatic motor, although it can also be employed in the alternative design in which the hydraulic fluid is allowed to rise in the panels to compress the gas in the upper portion of the vertical side panels and the convex roof panels (in which the curved cross-section is at right angles to the longitudinal axis of the car).

When employing the gas compressor/hydraulic pump combination it is possible, for example, to store the braking energy of a typical New York subway car on a typical service run by compressing the air to a pressure of 500 psi or less. The requisite gas volume to store the regenerated energy at this maximum pressure is 75 cu. ft. This volume could readily be contained in panels having a thickness of one inch or less.

During the regenerative braking cycle the present propulsion system (of FIG. 5) would operate as follows: the hydrostatic motor connected to the drive shaft operates as a hydrostatic pump that is directly coupled to the multi-stage centrifugal air compressor. The air compressor pumps atmospheric air into the reinforced hollow interconnected panels that constitute the gas accumulator. This process continues until the maximum gas pressure has been attained whereupon the hydraulic pump is shunted and the air compression ceases. The air compression can, of course, be terminated before the maximum pressure has been obtained (e.g., upon the completion of the braking cycle which harnesses the kinetic energy of the decelerating train).

During the subsequent acceleration of the rail vehicle, the compressed gas is expanded through the stages of the centrifugal compressor (now serving as a gas turbine) to drive the directly coupled hydraulic pump which in turn pumps the hydraulic fluid through the hydrostatic motors coupled to the drive shafts of the rail car vehicle. The hydrostatic pumps and motors are equipped with suitable instrumentation to control the piston displacement of the hydrostatic pumps or motors and thus to regulate the speed-torque characteristics of the hydrostatic transmission so as to extract the maximum energy from the compressed air in the accumulator. The expansion of the air is terminated when a previously determined lower pressure level is reached.

Figure 7A:
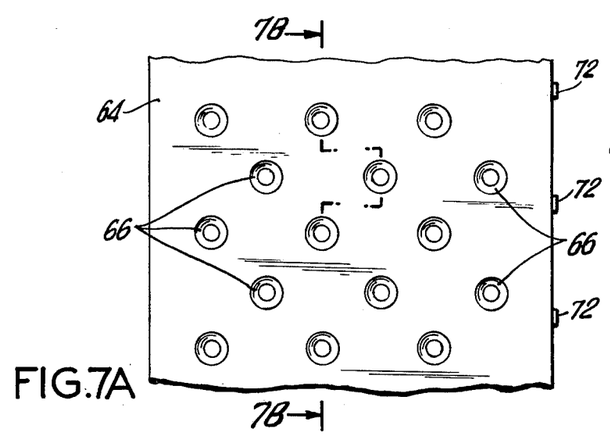
Figure 7B:
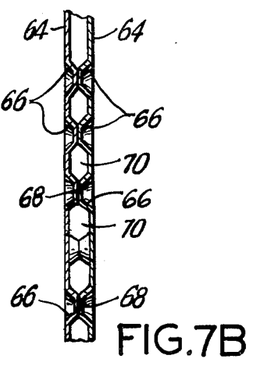

Although there are many practical ways of constructing the accumulator panels, the following approaches constitute preferred embodiments that offer important production economies. The two parallel metal sheets 64 which form the outer skin of the pressure panels are pressed in a die which is designed to impress a regularly spaced array of dimples or circular concave depressions 66 which have an amplitude one-half of the desired spacing between the parallel plates. The two parallel plates are disposed and aligned so that the inwardly protruding dimples come into contact throughout the entire array along a planar surface at the apex of each dimple. The dimples are then spot-welded as shown at 68 to each other at the planar area of contact to form an integral structure with gas/fluid accumulator areas 70 capable of withstanding the intended pressure load. The panels are joined and seal-welded along their periphery to form a totally enclosed pressure vessel. Suitable high pressure fittings 72 are also provided to permit the inter connection of panels and the inflow and outflow of compressed air and fluid flow. These panels are integrally joined to form the vehicle structure.

Figure 8A:
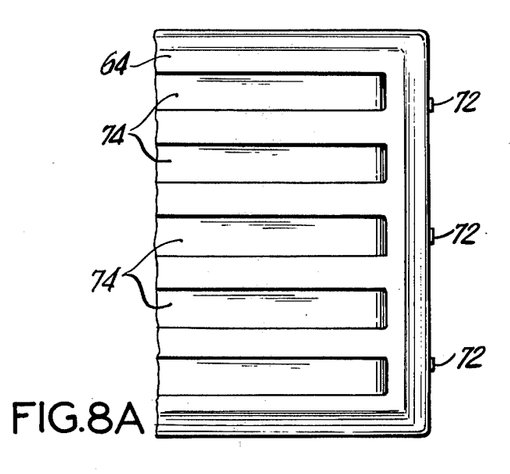
Figure 8B:
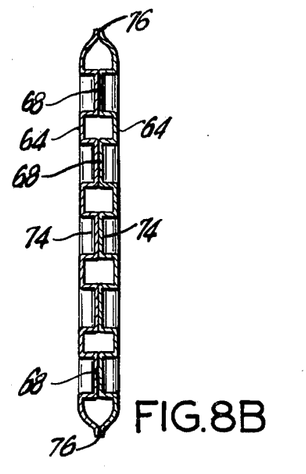
Figure 9A:
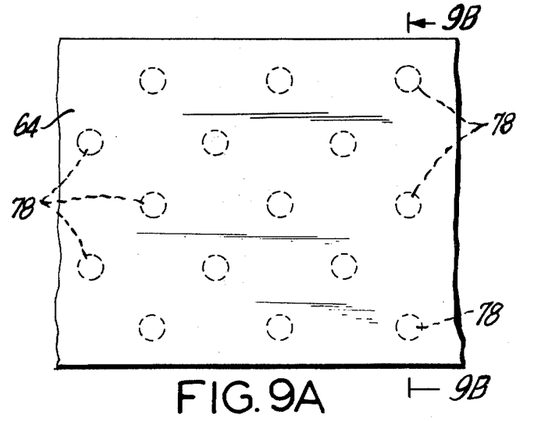
Figure 9B:
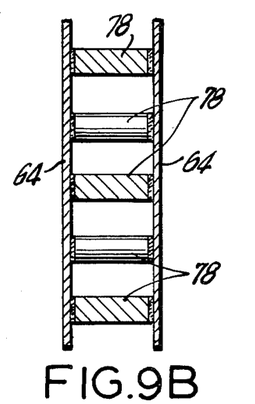

FIGS. 8A and 8B show an embodiment where the parallel plates are crimped at 74 to form inward protrusions which are aligned and welded at adjoining surfaces. The periphery is also welded at 76 to seal the vessel. FIGS. 9A and 9B illustrate parallel flat plates 64 which are interconnected in spaced relation by solid metal discs 78 welded at opposite sides to the plates 64 or other suitable means such as solid steel bars.

What is claimed is:

1. A propulsion system for a wheeled vehicle having a main structure including a chassis and body, comprising in combination: a prime mover for driving a hydrostatic pump, hydrostatic motor means operably associated with the wheels of said vehicle to hydraulically drive said wheels, gas accumulator means comprising a pressure vessel which is an integral structural part of said vehicle structure, hydraulic means for compressing a gas in said pressure vessel to store the kinetic energy of said vehicle during deceleration of the vehicle by operating said hydrostatic motor means as a hydrostatic pump or by diverting all or part of the hydraulic fluid from the prime mover-driven hydrostatic pump to actuate the hydraulic gas compression means, said compressed gas being subsequently caused to expand to accelerate said wheeled vehicle by displacing said hydraulic fluid through the hydrostatic motor means to drive the wheels of said vehicle.

2. A propulsion system as in claim 1 in which the gas accumulator pressure vessel comprises a structurally interconnected array of high pressure steel tubing disposed horizontally to form the flooring member of said vehicle.

3. A propulsion system as in claim 2 in which the gas accumulator pressure vessel comprises a sequence of stages at progressively higher pressure ratings, each stage comprising an array of structurally joined tubular members.

4. A propulsion system as in claim 3 in which the gas accumulator pressure vessel comprises a nest of concentric pressure cylinders, the highest pressure stage being maintained in the innermost cylinder and each successive annulus of greater radius constituting a sequential stage at progressively lower pressure vessel.

5. A propulsion system as in claim 4 in which the gas accumulator pressure vessel is mounted on a separate vehicle enclosed in an open protective steel shield, and hydraulically connected to an adjacent vehicle by means of flexible pressure hoses.

6. A propulsion system as in claim 3 in which the pressure levels sensed in each stage of a multi-stage accumulator are used to control the flow of hydraulic fluid for each stage.

7. A propulsion system as in claim 1 in which the gas accumulator pressure vessel comprises a plurality of interconnected hollow pressure-tight panels which form at least the vertical sides of said vehicle.

8. A propulsion system as in claim 7 in which the hydraulic gas compression means comprises a hydrostatic pump coupled to a multiple stage centrifugal air compressor which operates as a gas turbine during the expansion phase.

9. A propulsion system as in claim 1 in which the hydrostatic pumps and motors are of the variable displacement radial piston type.

10. A propulsion system as in claim 9 in which sensors and controls are provided to monitor the pressure in the gas accumulator vessel and to regulate the displacement of the hydrostatic pumps/motors in a predetermined negative/positive sense.

11. A propulsion system as in claim 9 in which the wheeled vehicle comprises a mass rapid transit rail vehicle.

12. A propulsion system as in claim 9 in which the wheeled vehicle comprises a passenger-carrying road vehicle employing an internal combustion engine as the prime mover.

13. A propulsion system for a wheeled vehicle having a main structure including a chassis and body, designed to convert the kinetic energy of the moving vehicle during deceleration into mechanical energy in the form of a compressed gas, comprising: a prime mover coupled to a hydrostatic pump of the variable displacement radial piston type, one or more hydrostatic pumps and motors, accumulator means including a gas accumulator pressure vessel for containing a compressed gas and also comprising an integral structural part of said vehicle structure, hydraulic means for compressing gas trapped in said gas accumulator vessel which is actuated by operating the hydrostatic motors as hydrostatic pumps during dynamic braking of the vehicle or by energizing the prime mover-driven hydrostatic pump, and control means for allowing the compressed gas to expand to propel the hydraulic fluid through said hydrostatic motors to driven the wheels and accelerate the vehicle.

14. A propulsion system as in claim 13 in which the prime mover comprises an electric motor.

15. A propulsion system as in claim 13 in which the prime mover comprises a gas turbine.

16. A propulsion system as in claim 13 in which the energy is stored by compressing air by means of a hydraulically actuated multi-stage, centrifugal compressor during regenerative braking of the vehicle, said compressed air being subsequently expanded through said centrifugal compressor which functions as a gas turbine for driving the hydrostatic pump to force hydraulic fluid through said hydrostatic motors to drive the wheels and accelerate the vehicle.

17. A propulsion system as in claim 13 in which the gas accumulator pressure vessel is disposed in the form of interconnected, hollow, gas-tight panels which comprise at least the vertical sides of said vehicle.

18. A propulsion system as in claim 17 in which the hollow, gas-tight accumulator panels include a spaced array of dimple-shaped circular depressions on at least one of two parallel metal sheets, said sheets comprising a hollow panel, said sheets in welded contact at said dimples.

19. A propulsion system for a wheeled vehicle having a main structure including a chassis and body comprising in combination: hydrostatic means operably associated with the wheels of said vehicle for hydraulically driving said wheels, a gas accumulator for storing kinetic energy of said wheeled vehicle during deceleration of said vehicle, said gas accumulator storing said kinetic energy as compressed gas by a hydraulic fluid, said gas accumulator comprising a pressure vessel which is mounted and constructed and arranged as an integral structural part of said main structure of said vehicle, and means for driving the wheels of said vehicle at least during periods when said vehicle is moving and said accumulator is not operably supplying hydraulic fluid for use in driving said vehicle.

* * * * *